US00RE42746E

(19) United States
(12) Reissued Patent
Gill et al.

(10) Patent Number: US RE42,746 E
(45) Date of Reissued Patent: Sep. 27, 2011

(54) PROCESS AND SYSTEM FOR DEFINING AND VISUALLY DEPICTING COLORS FROM THE COMPONENTS OF ARBITRARY COLOR MODELS

(75) Inventors: Timothy Gill, Denver, CO (US); Matthew Phillips, Mill Creek, WA (US); Parviz Banki, Issaquah, WA (US)

(73) Assignee: Quark, Inc., Denver, CO (US)

(21) Appl. No.: 11/251,636

(22) Filed: Oct. 14, 2005
(Under 37 CFR 1.47)

Related U.S. Patent Documents

Reissue of:
(64) Patent No.: 6,633,666
Issued: Oct. 14, 2003
Appl. No.: 09/143,279
Filed: Aug. 28, 1998

(51) Int. Cl.

| | |
|---|---|
| ***G06K 9/00*** | (2006.01) |
| ***G06K 9/34*** | (2006.01) |
| ***H04N 1/46*** | (2006.01) |
| ***G03F 3/08*** | (2006.01) |
| ***G06F 13/00*** | (2006.01) |

(52) U.S. Cl. ..... 382/162; 382/165; 358/515; 358/523; 345/591; 345/593; 345/604

(58) Field of Classification Search ..... 382/162–172; 358/1.9, 296, 500, 515, 518, 523, 527; 345/423, 345/431, 589–593, 600–604
See application file for complete search history.

(56) References Cited

U.S. PATENT DOCUMENTS

| | | | | | |
|---|---|---|---|---|---|
| 5,134,493 | A | * | 7/1992 | Laman et al. | 358/296 |
| 5,243,414 | A | * | 9/1993 | Dalrymple et al. | 358/500 |
| 5,254,978 | A | * | 10/1993 | Beretta | 345/601 |
| 5,313,570 | A | | 5/1994 | Dermer et al. | |
| 5,333,243 | A | * | 7/1994 | Best et al. | 358/1.9 |
| 5,384,901 | A | * | 1/1995 | Glassner et al. | 345/591 |
| 5,473,446 | A | * | 12/1995 | Perumal et al. | 358/523 |
| 5,546,105 | A | * | 8/1996 | Leak | 345/604 |
| 5,613,046 | A | | 3/1997 | Dermer | |
| 5,668,890 | A | * | 9/1997 | Winkelman | 382/167 |
| 5,668,931 | A | | 9/1997 | Dermer | |
| 5,713,062 | A | | 1/1998 | Goodman et al. | |

(Continued)

FOREIGN PATENT DOCUMENTS

| | | |
|---|---|---|
| EP | 852359 | 12/1996 |

(Continued)

OTHER PUBLICATIONS

Office Action mailed Apr. 26, 2000 from USPTO for U.S. Appl. No. 6,633,666.

(Continued)

*Primary Examiner* — Amir Alavi
(74) *Attorney, Agent, or Firm* — Faegre & Benson LLP

(57) ABSTRACT

A process and system for depicting a combination of process colors and spot colors on a radiant light source such as a computer monitor screen. The invention provides a user-definable "meta-ink" color which is made up of the components of the process colors and the spot colors. Shade values are assigned to each of these components to create the meta-ink color. This meta-ink color then replaces the document color for visual depiction on the radiant light source. This process and system provides a more accurate depiction of the representation of the printed image.

39 Claims, 4 Drawing Sheets

U.S. PATENT DOCUMENTS

| | | | | |
|---|---|---|---|---|
| 5,734,800 | A * | 3/1998 | Herbert et al. | 358/1.9 |
| 5,822,503 | A | 10/1998 | Gass, Jr. et al. | |
| 5,835,099 | A * | 11/1998 | Marimont | 345/591 |
| 5,867,169 | A * | 2/1999 | Prater | 345/604 |
| 5,892,524 | A | 4/1999 | Silverbrook | |
| 5,897,239 | A | 4/1999 | Caruthers, Jr. et al. | |
| 5,899,605 | A | 5/1999 | Caruthers, Jr. et al. | |
| 5,963,201 | A | 10/1999 | McGreggor et al. | |
| 6,002,893 | A | 12/1999 | Caruthers, Jr. et al. | |
| 6,205,452 | B1 | 3/2001 | Warmus et al. | |
| 6,247,011 | B1 | 6/2001 | Jecha et al. | |
| 6,313,840 | B1 * | 11/2001 | Bilodeau et al. | 345/423 |
| 6,327,599 | B1 | 12/2001 | Warmus et al. | |
| 6,631,375 | B2 | 10/2003 | Jecha et al. | |
| 6,650,433 | B1 | 11/2003 | Keane et al. | |
| 6,844,940 | B2 | 1/2005 | Warmus et al. | |
| 6,952,801 | B2 | 10/2005 | Warmus et al. | |
| 6,976,798 | B2 | 12/2005 | Keane et al. | |
| 6,986,105 | B2 | 1/2006 | Walker, Jr. | |
| 6,992,794 | B2 | 1/2006 | Keane et al. | |
| 6,993,209 | B1 | 1/2006 | Schowtka et al. | |
| 7,020,838 | B2 | 3/2006 | Tsykora | |
| 7,120,634 | B2 | 10/2006 | Jecha et al. | |
| 7,133,050 | B2 | 11/2006 | Schowtka | |
| 7,133,149 | B2 | 11/2006 | Keane et al. | |
| 7,145,670 | B2 | 12/2006 | Keane et al. | |
| 7,187,465 | B2 | 3/2007 | Keane et al. | |
| 2006/0069785 | A1 | 3/2006 | Barrett | |
| 2006/0129923 | A1 | 6/2006 | Tsykora | |
| 2006/0184432 | A1 | 8/2006 | Hanechak | |
| 2006/0218522 | A1 | 9/2006 | Hanechak | |
| 2007/0024908 | A1 | 2/2007 | Hanechak | |
| 2007/0024909 | A1 | 2/2007 | Hanechak | |
| 2007/0035746 | A1 | 2/2007 | Jecha et al. | |
| 2007/0044014 | A1 | 2/2007 | Hanechak | |
| 2007/0044018 | A1 | 2/2007 | Hanechak | |

FOREIGN PATENT DOCUMENTS

| | | |
|---|---|---|
| EP | 1040428 | 12/1998 |
| FR | 2804231 | 7/2001 |

OTHER PUBLICATIONS

Office Action mailed Jan. 30, 2001 from USPTO for U.S. Appl. No. 6,633,666.

Office Action mailed Sep. 10, 2001 from USPTO for U.S. Appl. No. 6,633,666.

Office Action mailed Apr. 5, 2002 from USPTO for U.S. Appl. No. 6,633,666.

Office Action mailed Oct. 22, 2002 from USPTO for U.S. Appl. No. 6,633,666.

* cited by examiner

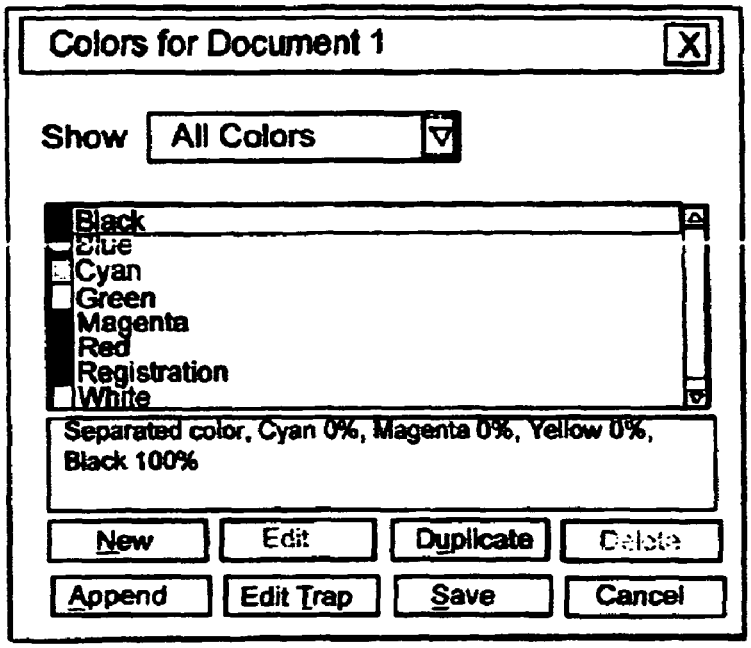
*Figure 1*
*Figure 2*
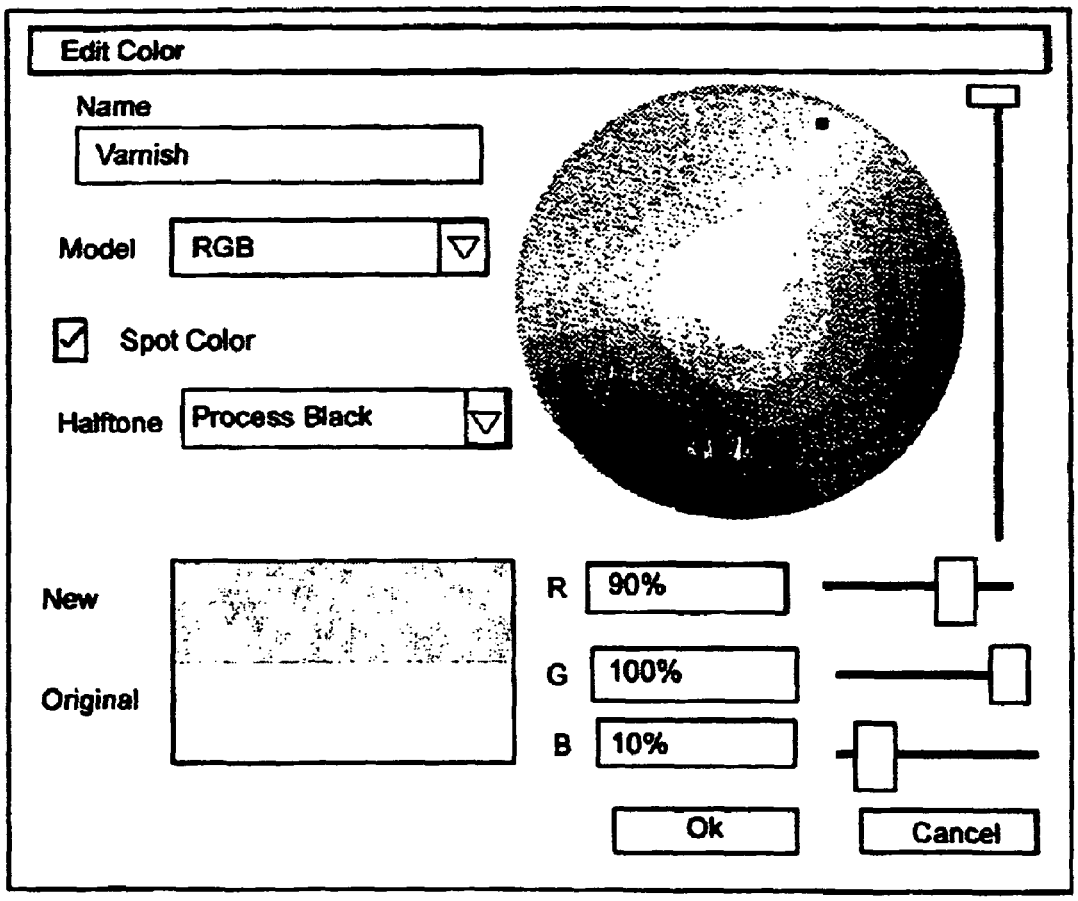

PROCESS AND SYSTEM FOR DEFINING AND VISUALLY DEPICTING COLORS FROM THE COMPONENTS OF ARBITRARY COLOR MODELS

Matter enclosed in heavy brackets [ ] appears in the original patent but forms no part of this reissue specification; matter printed in italics indicates the additions made by reissue.

FIELD OF THE INVENTION

This invention relates to electronic publishing and particularly to defining and depicting colors for use in electronic publishing.

BACKGROUND OF THE INVENTION

Electronic publishing has become the standard for developing documents for publication. Publication in this day and age includes not only printed publication but multi-media publications such as CD-ROM or World Wide Web documents as well. Thus, electronic publishing includes content preparation, such as text articles, images and even audio or video in multi-media documents, pre-press layout, proofing and printing.

Color is an important feature in designing documents for publication, whether for print or electronic publication. There are a number of concerns with the integration of color into electronic publishing, not the least of which is the accurate depiction of color on a computer monitor during the design and layout of the document relative to the final printed version. This concern is dependent upon a number of factors, including the spectral qualities relating to how the colors are displayed on a computer monitor screen as compared to the printed colors.

Another concern with color in electronic publishing is the limitations on the definition of colors. Presently, colors must be defined in terms of the components of a single traditional color model. Colors may be converted between these traditional color models, but may not be defined from more than one color model at a time.

A number of traditional color models are currently used in electronic publishing, depending on the document to be created and the printing process to be used. These color models normally fall into two categories, "spot" colors and "process" colors. Spot colors require a separate plate, that is, an image of a page, for each spot color used in the document. Spot colors are typically used for documents that only use one to three colors or for documents using special colors such as fluorescent colors, metallic colors or proprietary colors, such as a company color. Thus, spot colors are normally used for simple documents or for special colors.

Process colors are colors which are created by using percentages of primary color components, such as tints of cyan, magenta, yellow, and black (CMYK) that are blended together to create other colors. Process colors provide many more colors than spot colors for printing purposes and are normally used with documents containing color photography or other items using more than three colors. A document using process colors is separated into separate plates, each containing one of the component colors, such as four separate plates containing differing tints of four primary colors (CMYK). The process of splitting a composite document into its constituent plates and generating an image for each plate is called "separation".

One of the problems occurring with existing electronic publishing systems occurs when a document is created using process colors, but also requiring a spot color as well. For instance, a special color such as a fluorescent color or a metallic color may be used which can not be created using the process colors. Many documents may also require proprietary colors, such as in a company logo. For instance, a magazine having photography and a company logo may require both color models. Also, many high end publications may use a "varnish" or other special color layer to be applied over an image to create an added effect. A "varnish" may be a translucent color which tints an overall image or document to add a surface effect on the printed image. The addition of spot colors to a document using process colors is not a problem for the actual printing process. An additional plate is created for that particular spot color during the separation.

However, the adding of a spot color onto a document process color is a problem during the electronic design process. Presently, when such a spot color is applied during the design or layout phase of the publishing process, it is difficult to accurately depict on screen. Typically, during the design phase, the process document colors are converted to a color model which can be depicted on a computer monitor screen, such as RGB or LAB. However, the existing algorithms are unable to convert process colors which have been combined with spot colors or with the combination of arbitrary inks. If an on-screen image using process colors is overlayed by the spot color, then that image is blocked from view. Typically, the designer will create two duplicate boxes, one containing the image and the other containing the spot color to be applied. The final image to be printed is not able to be accurately displayed prior to the actual printing of the image. This is of concern since neither the designer nor others later working with the document are sure of the final image.

Since process colors are normally used in most higher end documents, this is an important issue in the publishing industry. Thus, a problem exists in accurately depicting color documents during the electronic design of such documents.

Another problem with the prior electronic publishing systems is the definition of colors digitally. The prior electronic publishing systems utilize standard color models to define colors used in the document and the depiction of the document on a computer screen. These standard color models, such as RGB, LAB, CMYK, Hexachrome, Pantone and others, each use defined color components. For instance, a color defined in the RGB color model uses differing percentages of Red, Green and Blue, the color components of the RGB color model. A color defined in the CMYK color model only uses percentages of Cyan, Magenta, Yellow and/or Black. A color defined in the Hexachrome color model only uses percentages of Cyan, Magenta, Yellow, Black, Orange and Green. Each of the color models use only their respective components in defining a color.

These electronic publishing systems are unable to define a color using "arbitrary" color components. These color components, often referred to as "inks", are limited for use only within their respective color model. Colors defined in terms of inks in one color model may be converted into the inks of another color model, but a color has not been able to be previously digitally defined in the inks of more than one color model at a time. Thus, a problem exists in the inability to define a color with color components or inks outside of a particular color model.

SUMMARY OF THE INVENTION

The present invention solves these and other problems by providing a process and system for defining and representing combinations of colors that was not previously possible. In accordance with one preferred embodiment of the present invention, the process includes a user-definable "meta-ink" color which is made up of the components of the process colors and the spot colors and the shade values assigned to each of the color components. The document color is then replaced by this meta-ink color for depiction purposes on a radiant light source, such as a computer monitor screen.

This process is implemented, in one preferred embodiment, by a model wherein the meta-ink colors are defined as a series of references between document colors (a named entity which describes a color in a document). These references each specify the meta-ink color, the spot or process color and the percentage (or shade) of each meta-ink color on the spot or process color or even on an arbitrary color, as defined in greater detail in the discussion of a preferred embodiment. Any number of meta-ink colors may be attached to any number of colors.

The system of the present invention, in one preferred embodiment, takes the user-defined meta-ink color and converts the process color components and their assigned shade values of this meta-ink color into RGB values. The system then shades each of the RGB components of the spot colors of this meta-ink color according to the shade values which have been assigned to each of the components in the definition of the meta-ink color. The shaded values for each of the spot color components is "layered" onto the RGB values converted from the process color components of the meta-ink color in an iterative process. That is, each of the spot colors defined in the meta-ink color are respectively layered onto the preceding value of the previously defined spot color layered onto the RGB values converted from the process color components. The final value of the iterative process is computed and converted into a color model suitable for the radiant light source, such as a LAB color model value. This process essentially treats the color inks as a series of photographic filters which attenuate the spectrum of the combined colors to depict the combined colors in an accurate representation of the printed image. This layering of the spot colors is analogous to placing a series of photographic filters, one for each spot color, over the image. The spot colors are thus able to be more accurately depicted on the screen as a match for the colors of the printed image.

These and other features of the present invention are described in greater detail in the ensuing description of a preferred embodiment and in the drawings.

BRIEF DESCRIPTION OF THE DRAWINGS

FIG. 1 is a screen shot of a Edit menu for colors in a design or layout program;

FIG. 2 is a screen shot of a menu for Editing Colors in a deign or layout program;

DESCRIPTION OF A PREFERRED EMBODIMENT OF THE PRESENT INVENTION

Figure 3:
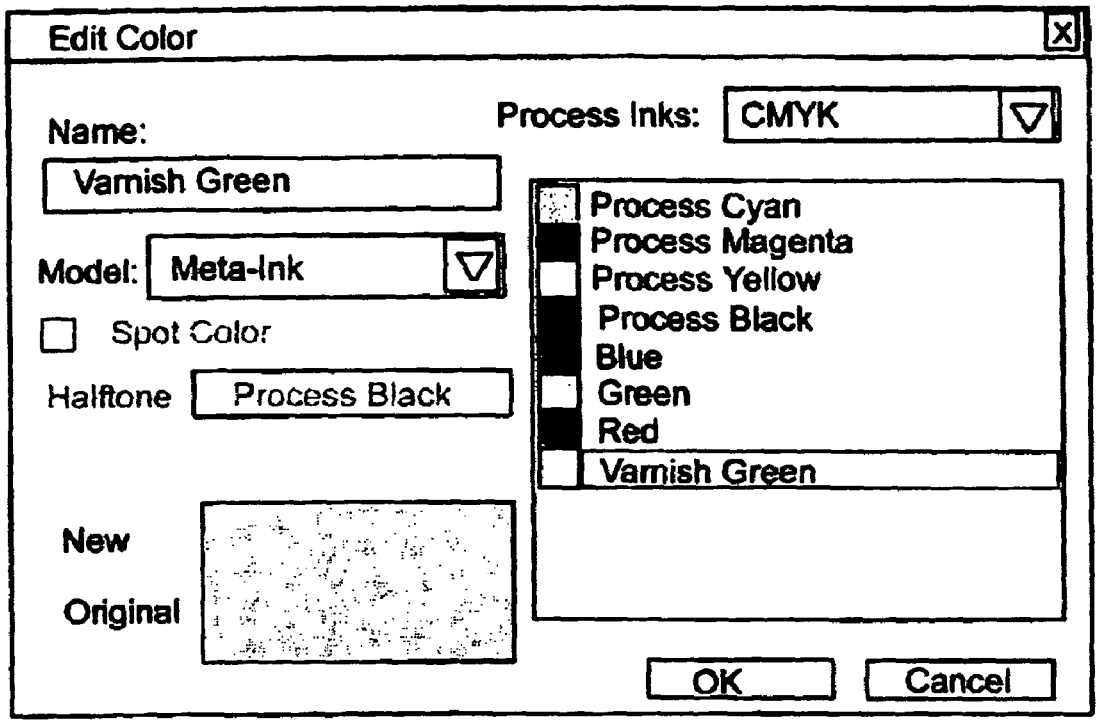
FIG. 3 is a screen shot of a menu for defining the color components and shade values in the program of FIG. 1.

The present invention provides a process and system for defining and representing combinations of colors not previously possible in a single document color. In particular, the present invention is able to define colors in terms of components of more than one color model as well as provide a more accurate depiction on a computer monitor screen or other radiant light source, of one or more spot colors applied onto a document which uses process colors. It is to be expressly understood that the exemplary description that is discussed herein is for descriptive purposes only and is not meant to limit the scope of the inventive concept. Other implementations of the inventive concept are considered to be within the scope of the appended claims.

There are numerous programs available for the electronic design and/or layout of documents. One such program is QuarkXPress™ distributed by Quark Distribution, Inc. This program enables documents to be created which may include color. A Document Color, that is, a named entity which describes a color in a document, whether as the background of a box, a frame, text, etc., can be selected based on one of various color models. These color models include process colors such as CMYK or Hexachrome and spot colors such as RGB and user-defined colors. The user-defined spot colors can include special colors such as fluorescent colors, metallic colors, varnishes and special standardized colors, such as used in official company colors.

The document, depending upon the selected printing process, is typically separated into a plurality of separate images, where each image contains only one color or tints of a color. These images are referred to as plates". Multiple plates are used to create a variety of colors in the document. For printing spot colors, each single plate contains a spot color. However for printing process colors, the process colors are separated into plates containing various percentages or tints of a primary color. For instance, CMYK process colors are separated into four plates, one each of Cyan, Magenta, Yellow and Black. These four plates are blended together to create other colors. This type of color model is termed a "subtractive" color model, in that light is subtracted from the document by the layering of the inks or colors. As more inks or colors are added onto the image, the closer the final color comes to black. The colors are displayed by the light reflected from the printed image. Also, each spot color is contained on a separate plate.

During the design process, these colors must be accurately depicted on a computer monitor screen. However, colors or inks as displayed on a monitor screen are "additive" colors. Light is projected on the screen which is initially black. As colors are added, the closer the final color comes to white. The pixels of a computer monitor screen are red, green and blue, thus RGB or LAB color models are normally used to depict images on the screen. During the design of a document, the process colors used are converted to spot colors for depiction on a computer screen during the design phase.

The present invention provides a capability to additionally modify the existing color models in order to more accurately depict the document colors when a spot color is added to a document created with process colors or arbitrary inks that are defined by components of more than one color model. One example of such a document would be a marketing brochure having photographs and a company logo using a proprietary color. Process colors are preferred for the photographs while a spot color may be necessary for the company logo. This may not be a problem for the printed image since an additional plate can be used for the spot color during separation. However, the depiction of this document may be difficult on a computer monitor screen as discussed in the background of the invention. It is very important that the spot colors be accurately represented on the screen for the printed piece match to the on-screen depiction. This representation is merely a stand-in for the color that is used at the actual print-time.

A preferred embodiment of the present invention is illustrated in FIGS. 1 through 6 which provides a process and system for more accurately representing the combined colors for this depiction.

User Defined Meta-inks

Normally, a process color is made up of percentages of the primary colors of the process color model. The process color model CMYK will be used for descriptive purposes. In this instance, a particular shade of green color"New Green" formed from CMYK having the following percentages: 70% cyan, 10% magenta, 100% yellow and 0% black is used as a document color. The document designer may decide to add a spot color, such as a "varnish" spot color that is formed from RGB color model with 90% red, 100% green and 10% blue, in a light shade over the green document color for added effect, such as changing the surface appearance on the printed picture. The Varnish color can be created first. This allows the Varnish to be used in other images or other documents. The Varnish spot color is created, in one particular embodiment of the invention by defining it as an RGB spot color with the above described RGB components. This is illustrated in FIG. 1.

Figure 4:
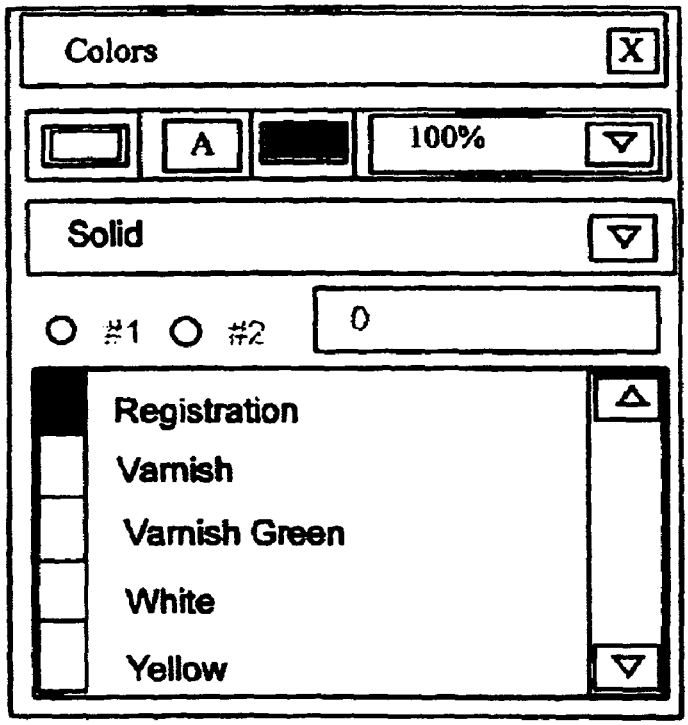
FIG. 4 is a screen shot of a menu for selecting a user-defined meta-ink color for replacing a document color.

In this preferred embodiment, a "meta-ink" is created to depict this new color on a computer monitor screen. As shown in FIGS. 1-4, the meta-ink color is defined in a series of dialog boxes. The dialog box "Edit Color" is selected from a menu as shown in FIG. 2 for editing colors by selecting the "New" button. Then, "meta-ink" is selected in the menu choice of Color Models as shown in FIG. 3. A name, such as Varnish Green, is given to the new color that is to be created in the Name menu. The Process Inks menu allows the selection of the color model, such as CMYK or Hexachrome. The process color onto which the varnish is to he added is created by choosing the appropriate components of the process color model and the RGB components. The appropriate shade values are applied to each of these components. In the above described document color, the document color that is being used is defined as cyan having a shade value of 70%, magenta having a shade value of 10%, yellow having a shade value of 100% and black having a shade value of 0%. (This is equivalent to the New Green document color described above.) The Varnish is then applied by selecting the previously defined RGB spot color "varnish" and applying the desired shade value, such as a 10% shade value. The new color, named "Varnish Green", is then saved. This color can then be selected as the new document color as shown in FIG. 4. The visual display of this new document color will be a more accurate depiction of the image which will be printed.

Figure 5:
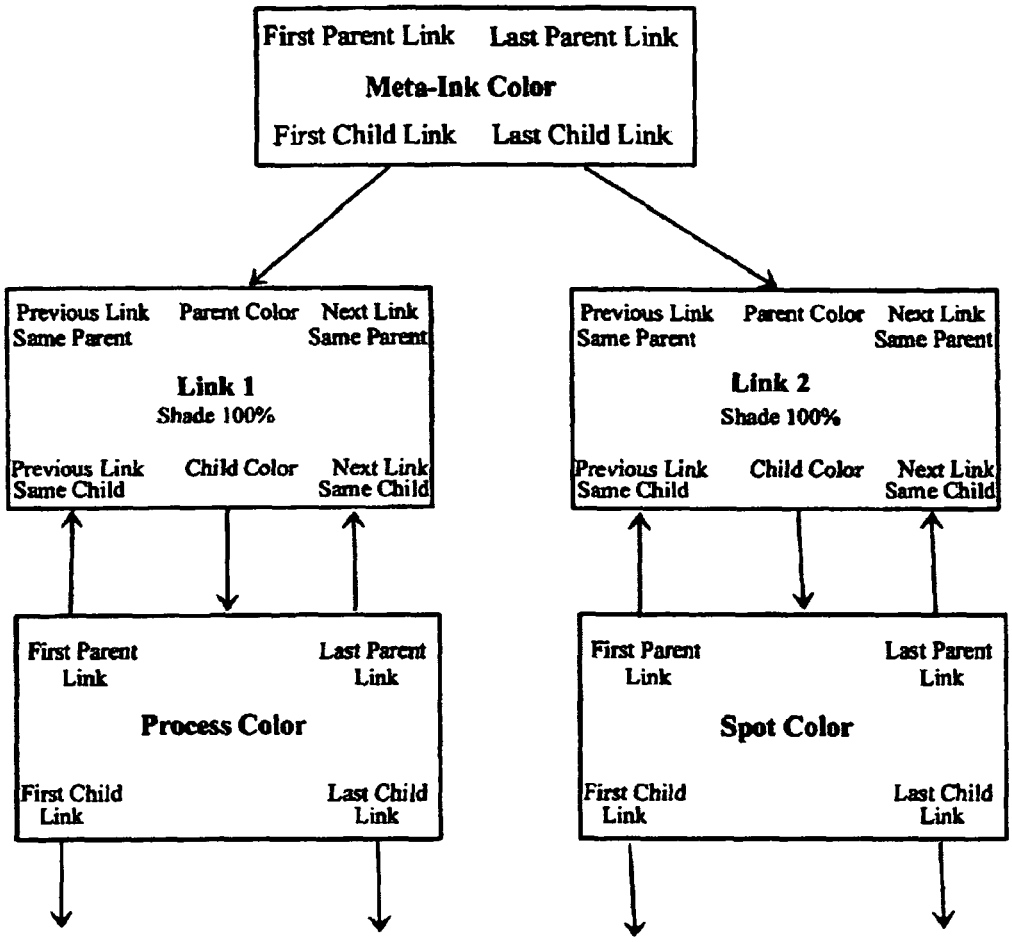
FIG. 5 is a flow chart of the internal representation of the process of a preferred embodiment of the present invention.

This procedure, in one preferred embodiment, is implemented as described in the flow charts illustrated in FIG. 5. The meta-ink color is defined internally using a series of references between Document Colors. Each reference is a separate entity which specifies the meta-ink color the Spot or Process Color and the percentage (shade) of the meta-ink color on the spot or process color plate. References between each meta-ink color and each spot or process color are contained within the data structure of each of the references. Thus, any number of meta-ink colors can be attached to any number of colors. This procedure can be implemented in may ways, including various programming languages.

On-Screen Representation

The task of the on-screen representation of the meta-ink colors requires the determination of an RGB coordinate set for each of the meta-ink colors as they are created. In the preferred embodiment of the present invention, the meta-ink colors are actually modeled as transparent inks. In this sense, the inks act as photographic filters. A preferred embodiment of this representation is described in the flow chart illustrated in FIG. 6.

Figure 6:
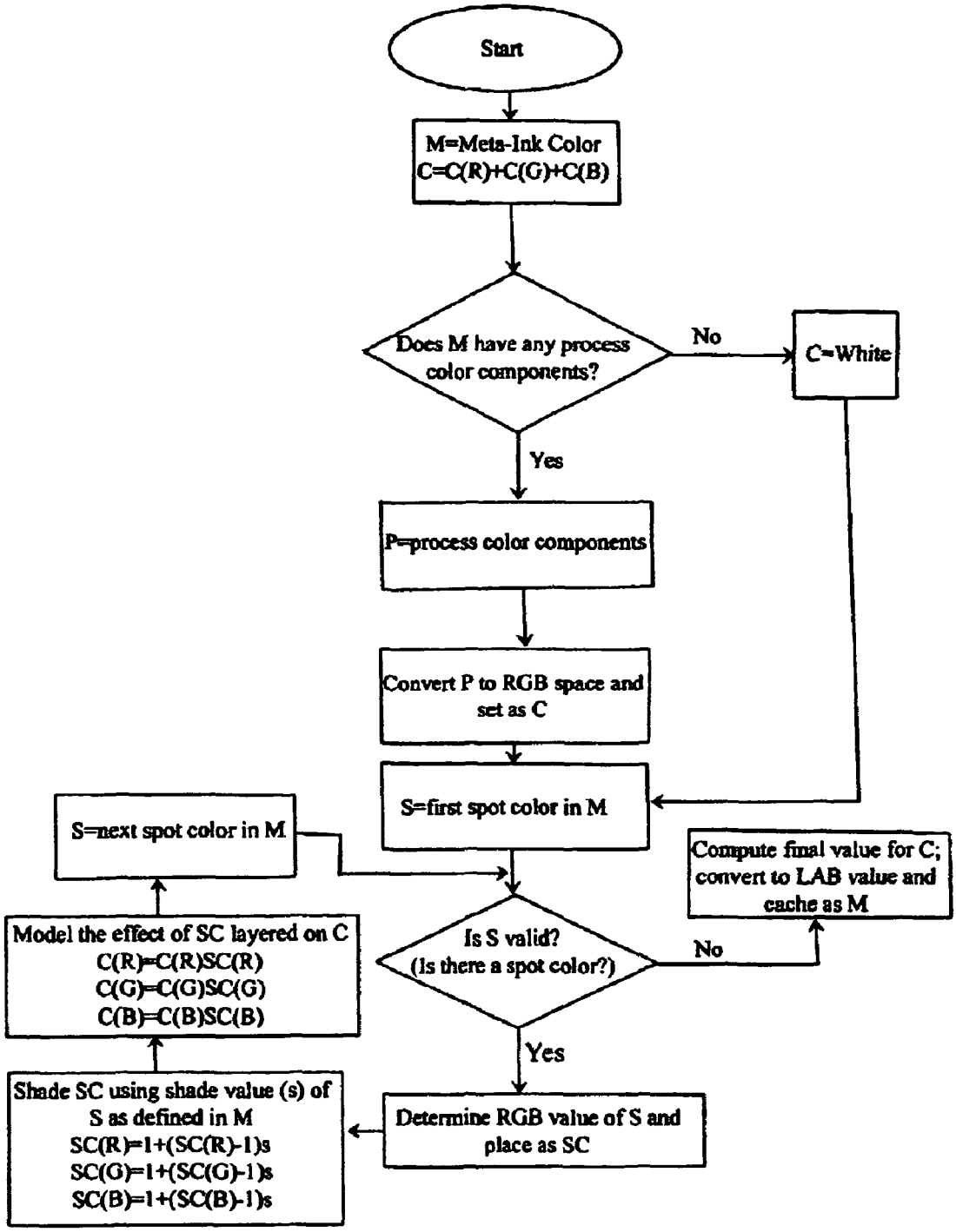
FIG. 6 is a flow chart of the process of determining the visual display of the embodiment of FIG. 5.

As illustrated in FIG. 6, the process begins with initializing the user-defined meta-ink color as M with the definition as discussed above. This definition of M will include the process color components, the spot color components and their respective shade values. Value C, the RGB coordinate set of M is declared as having three components, CR, CG, CB (Red, Green and Blue components). M is examined to determine whether it has any process color components. If there are no process color components, then the value of C is set to the color White, that is, CR=CG=CB=1.0. If there are process color components in M, then these process color components are used to build a process color P while initially ignoring any contributions of non-process color components in M. Once P has been built, then well-known algorithms are used to convert P to RGB space. This result is then placed in C in lieu of the value for White.

S is then defined as the first spot color that is defined in M. (This would be the Varnish in the previous example). If there is no value for S, that is, there is no spot color defined in M, then C is computed and converted to the color model for the display, such as LAB, and this value is cached as M for future use. If there is a value for S, then the RGB value for that spot color is determined based upon the existing definition for that spot color. This value is placed in a temporary RGB color variable SC. SC is then shaded according to the shade value "s" of S as set forth in the definition of M (10% of the Varnish as described in the earlier example). Each component of S, that is, SCR, SCG, SCB, is shaded by the equation $SCn=1+(SCn-1)(s)$. The effect of SC is then modeled onto C by the formula $Cn=CnSCn$ for each of the RGB components. This is repeated for each of the spot colors found in the definition of M. The shaded value for the next spot color (SC) is then layered onto the previously determined value of C. Once the list of spot colors has been exhausted, then the final value of C is computed, converted to the appropriate color model and cached as the value of M for display purposes. Ideally, the final value of C is converted to the LAB color model, which is device independent.

The procedure takes advantage of the ability to get a good starting point RGB value if any process components are used. The remaining spot colors, if any, are treated as transparent inks with three "point" spectral values at Red, Green and Blue. No assumptions are made in regard to the wavelengths or any other spectral properties of the inks. The inks are treated as photographic filters which attenuate the existing "spectrum" made up of the current RGB value at any point in the process exactly as their RGB components.

Printing

Printing of the document is normally done one of two ways, Separation printing and Composite printing. Separation printing, as discussed above, separates the colors into plates. In the present invention, separation printing with the meta-ink concept is simple. If a meta-ink color contributes to a given plate (that is, its shade on the plate is nonzero), then the meta-ink will image with the appropriate shade value. If it does not contribute, then the meta-ink color will "knock-out", that is, the object which uses that color draws as white on that plate. This prevents the other objects which do contribute on that plate from overlapping. If the shade value of the meta-ink is less than 100%, then the resulting shade on each plate of the separation is modified by multiplying the internal shade value (as defined in the relationship between the child plate and the parent plate (meta-ink color) by the external shade value (the value defined by the user when defining the meta-ink color for the document color). For example, a meta-ink color that is defined internally as 20% Black and internally 100% PANTONE 200 CV when shaded 100% will result in a 20% contribution on the Black plate and a 100% contribution on the PANTONE 200 CV plate. However, if the user decides to shade the meta-ink color to 50%, that is, halfway to white, then the contribution on the Black plate will be 10% and the contribution on the PANTONE 200 CV plate will be 50%.

Composite printing, however, requires a single CMYK or RGB value. In this case, the value defined earlier for the display representation is used, such as the LAB value, for the basis of the CMYK or RGB value. There is one exception to this rule however. If the meta-ink color consists only of process components and the color space of those components matches the output space, then the process components (CMYK) are used directly. For example, if a meta-ink color consists only of 100% Cyan and 50% Yellow, the CMYK coordinates (100,50,0,0) are used. If the user subsequently adds a spot color to the definition of this meta-ink color, then the equivalent value calculated for the display representation as discussed above is converted to CMYK values using standard color conversion techniques.

Arbitrary Inks

This process also allows the digital definition of colors by use of arbitrary inks. This inventive process is not necessarily limited to the combination of a single process color and a single spot color. A user may select components or inks from more than one color model in order to digitally define a color. This can occur in a manner as described above. A user would select the "meta-ink" function on the New color menu. The various inks or color components from several color models would then be displayed. The user would select the desired inks, regardless of color model and assign a shade or percentage to each of the desired inks. This new color would be processed in a manner similar to that discussed above to render a visual depiction of that new color on the computer monitor screen. The printer would print this as a process color by adding new plates for the additional inks beyond the standard four-color separation plates. Thus, a user is able to define a color without being limited to standard color models.

The above embodiment is provided for descriptive purposes only. Other implementations and embodiments are considered to be within the scope of the inventive concept as set forth in the claims.

What is claimed:

1. A system for determining a coordinate set for visual depiction onto a computer monitor of a process color having at least one spot color applied to it, said system comprising:

means for defining the process color into process color components and percentage values;

means for defining the at least one spot color into spot color components and percentage values;

means for converting said process color components and their percentage values into a coordinate set values for visual depiction;

means for determining said coordinate set values of said at least one spot color components;

means for applying percentages to said coordinate set of values of said at least one spot color components according to said percentage values for said at least one spot color components;

means for determining a value for said percentages of said at least one spot color components layered onto said coordinate set of values converted from said process color components; and means for converting said determined value for said percentages of said at least one spot color components layered onto said coordinate set of values converted from said process color components into said coordinate set.

2. The system of claim 1 wherein said means for converting said process color components into said coordinate set values includes:

means for setting said coordinate set values for said process color components to said coordinate set values for the color white if there are no process color components.

3. The system of claim 1 wherein said means for determining a value further includes:

means for determining said value by an iterative process for each of the spot colors sequentially layered on the previously determined said value until said value is finally determined.

4. The system of claim 1 wherein said means for assigning said percentages of said spot color components according to said shade value includes:

means for applying percentages to each of the components of the coordinate set values according to said percentage value for those components.

5. The system of claim 4 wherein said means for determining a value includes:

means for determining a value for each of the coordinate set components for each of said percentage values for each of said coordinate set components layered onto each of the components of said coordinate set values converted from said process color components.

6. A system for visually depicting a document having at least one spot color applied onto a document process color on a computer monitor screen, said system comprising:

means for defining the document process color;

means for defining each of at least one spot colors to be applied onto the document process color;

means for applying shade values to each of said document process color;

means for applying shade values to each of said at least one spot colors;

means for defining a new color based on the shade values applied for each of said document process color and for each of said at least one spot color; and means for applying said defined [mew] *new* color to a document depicted visually on a computer monitor screen.

7. The system of claim 6 wherein said system further includes:

said means for defining the document process color includes:

means for defining the process color components of the document process color; and said means for applying shade values to each of said document process color and to each of said at least one spot color includes:

means for applying a shade value to each of the process color components of the document process color.

8. The system of claim [6] *7* wherein said system further includes:

said means for defining each of at least one spot color to be applied onto the document process color includes:

means for defining the spot color model components of each of the at least one spot color to be applied onto the document process color; and said means for applying shade values to each of said document process color and to each of said at least one spot color further includes:

means for applying a shade value to each of the components of each of the at least one spot color to be applied onto the document process color.

9. The system of claim 6 wherein said system further includes:

said means for defining the document process color includes:

means for defining the process color components of the document process color;

said means for defining each of at least one spot color to be applied onto the document process color includes:

means for defining the spot color model components of each of the at least one spot color to be applied onto the document process color; and said means for applying shade values to each of said document process color and to each of said at least one spot color further includes:

means for applying a shade value to each of the process color components of the document process color and to each of the spot color components of each of the at least one spot color to be applied onto the document process color.

10. The system of claim 6 wherein said means for defining a new color includes:

means for layering on each of said at least one spot color onto said document process color sequentially in an iterative process.

11. The system of claim 6 wherein said means for applying said defined new color to a document depicted visually on a computer monitor screen includes:

means for converting the defined new color obtained from said means for defining a new color into a spot color model for display onto a computer monitor screen.

12. A process for digitally depicting a document having a combination of process colors and spot colors on a computer monitor screen, said process comprising the steps of:

defining the process colors;

defining the spot colors;

assigning shade values to each of said process colors;

assigning shade values to each of said spot colors;

defining a color based on the combination of said assigned shade values for each of said process colors and for each of said spot colors; [and]

applying said defined color to the document visually depicted on the computer monitor screen*; and*

*wherein at least one of the above said steps is performed using a computer*.

13. The process of claim 12 wherein said step of defining process colors and the spot colors further includes:

converting said process color into an RGB value.

14. The process of claim 12 wherein said step of defining the process colors and the spot colors further includes:

determining the RGB value for the spot color.

15. The process of claim 12 wherein said step of defining a color based on the combination of said assigned shade values for each of said process colors and for each of said spot colors further includes:

determining a value for said defined color based on each of said spot colors shaded by said assigned shade value layered onto each of said process colors.

16. The process of claim 12 wherein said step of defining the process colors and the spot colors includes:

defining the process colors by the components of the process color model; and defining the spot colors by the components of the spot color model.

17. The process of claim 16 wherein said step of defining a color includes:

assigning shade values to each of said components of the process colors; and assigning shade values to each of said components of the spot colors.

18. A system for digitally defining a color formed from at least two color models, said system comprising:

means for selecting at least one color component from a first color model;

means for selecting at least one additional color component from at least one other color model; and means for assigning percentages to each of said selected color components from said first color model and from said at least one other color model to create a user-defined color.

*19. A method comprising:*

*selecting at least one color component from a first color model;*

*selecting at least one additional color component from at least one other color model;*

*assigning shade values to each of the selected color components from the first color model and from the at least one other color model to create a user-defined color; and*

*wherein at least one of said selecting and assigning is performed using a computer.*

*20. A system comprising:*

*a document production process represented in composite form which is to be rendered on a first rendering device with one or more colors from a first set of color models;*

*means for creating one or more user-defined meta-ink colors;*

*means for creating one or more approximations of the document production process by approximating the document production process in composite form with the one or more user-defined meta-ink colors, wherein the one or more approximations of the document production process are capable of being rendered by a second rendering device; and*

*means for creating one or more intermediate representations of the document production process in composite form by approximating the document production process.*

*21. The system of claim 20, wherein the first rendering device comprises a printing press.*

*22. The system of claim 20, wherein the second rendering device comprises a computer display.*

*23. A system comprising:*

*a document production process including one or more document colors;*

*a first rendering device capable of rendering documents in accordance with a first set of color models;*

*a second rendering device capable of rendering documents in accordance with a second set of color models; and*

*a meta-ink color capable of being used by the second rendering device in rendering an approximation of the document production process, the meta-ink formed, at least in part, by assigning shade values to a component of a color in the first set of color models and to a component of a color in the second set of color models.*

*24. The system of claim 23, wherein the first rendering device comprises a printing press.*

*25. The system of claim 23, wherein the second rendering device comprises a computer display.*

*26. The system of claim 23, wherein the first set color models includes one or more of the following: a Cyan-Magenta-Yellow-Black (CMYK) process color model, a Hexachrome color model, a Red-Blue-Green (RBG) spot color model, and a user-defined color model.*

*27. A method comprising:*

*accepting a production process document which is to be rendered on a printing press with a first set of one or more color models;*

*creating an intermediate composite representation of the production process document by approximating the production process document in composite form with a second set of one or more color models capable of being rendered by a computer display; and*

*rendering an accurate depiction of the production process document on the computer display based on the intermediate composite representation of the production process document; and*

*wherein at least one of said accepting, creating and rendering is performed using a computer.*

*28. The method of claim 27, wherein creating an intermediate composite representation comprises:*

*defining a set of one or more process colors used in the production process document;*

*defining a set of one or more process spot colors used in the production process document;*

*assigning shade values to each of said one or more process colors used in the production process document;*

*assigning shade values to each of said one or more spot colors used in the production process document; and*

*defining a color based on the combination of said assigned shade values for each of said process colors and for each of said spot colors.*

*29. The method of claim 27, wherein said rendering an accurate depiction of the production process document on the computer display based on the intermediate composite representation of the production document comprises applying the defined color to the intermediate representation.*

*30. The method of claim 27, wherein the first set of one or more color models includes one or more of the following: a Cyan-Magenta-Yellow-Black (CMYK) process color model, a Hexachrome color model, Red-Blue-Green (RBG) spot color model, and a user-defined color model.*

*31. The method of claim 27, wherein the first set of one or more color models is different than the second set of one or more color models.*

*32. The method of claim 27, wherein the second color model comprises a meta-ink color model.*

*33. A system comprising:*

*a first set of one or more graphical user interface (GUI) components configured to receive an indication regarding at least one color component from a first color model;*

*a second set of the one or more GUI components configured to receive an indication regarding at least one additional color component from at least one other color model; and*

*a third set of the one or more GUI components configured to assign shade values to each of the selected color components from the first color model and from the at least one other color model to create a user-defined color.*

*34. The system of claim 33, wherein the first set of one or more GUI components, the second set of one or more GUI components, and the third set of one or more GUI components are all displayed concurrently within the same window.*

*35. The system of claim 33, wherein the first set of one or more GUI components, the second set of one or more GUI components, and the third set of one or more GUI components are all displayed in separate windows.*

*36. The system of claim 33, wherein one or more GUI components from the first set of one or more GUI components, the second set of one or more GUI components, and the third set of one or more GUI components comprise a drop down list.*

*37. The system of claim 33, wherein one or more GUI components from the first set of one or more GUI components, the second set of one or more GUI components, and the third set of one or more GUI components comprise a slider bar.*

*38. The system of claim 33, wherein one or more GUI components from the first set of one or more GUI components, the second set of one or more GUI components, and the third set of one or more GUI components comprise a text box.*

*39. The system of claim 33, wherein one or more GUI components from the first set of one or more GUI components, the second set of one or more GUI components, and the third set of one or more GUI components comprise a color palate.*

* * * * *